United States Patent [19]

Ona et al.

[11] Patent Number: 5,620,787
[45] Date of Patent: Apr. 15, 1997

[54] ORGANOPOLYSILOXANE EMULSIONS AND FIBERS COATED THEREWITH

[75] Inventors: Isao Ona; Masaru Ozaki; Toshio Saruyama; Masahiko Suzuki, all of Chiba Perfecture, Japan

[73] Assignee: Dow Corning Toray Silicone Co., Ltd., Tokyo, Japan

[21] Appl. No.: 592,979

[22] Filed: Jan. 29, 1996

Related U.S. Application Data

[62] Division of Ser. No. 362,626, Dec. 22, 1994, Pat. No. 5,521,238.

[30] Foreign Application Priority Data

Dec. 24, 1993 [JP] Japan ..................... 5-347513

[51] Int. Cl.[6] .......................................... B32B 7/00
[52] U.S. Cl. .................. 442/102; 428/391; 428/394; 428/395; 428/447; 428/451; 428/452; 428/475.5; 428/480; 428/523
[58] Field of Search ..................... 428/266, 267, 428/268, 447, 451, 391, 394, 395, 475.5, 480, 523

[56] References Cited

U.S. PATENT DOCUMENTS

| | | | |
|---|---|---|---|
| 4,559,385 | 12/1985 | Huhn et al. | 524/838 |
| 4,579,964 | 4/1986 | Totten et al. | 252/8.6 |
| 4,935,464 | 6/1990 | Ona et al. | 524/837 |
| 5,110,865 | 5/1992 | Ona et al. | 524/838 |
| 5,269,951 | 12/1993 | McVie et al. | 252/8.6 |
| 5,300,241 | 4/1994 | Mikami et al. | 252/8.6 |
| 5,395,549 | 3/1995 | Ozaki et al. | 525/8.6 |

FOREIGN PATENT DOCUMENTS

| | | |
|---|---|---|
| 34-2041 | 6/1959 | Japan . |
| 41-13995 | 3/1966 | Japan . |
| 63-245466 | 10/1988 | Japan . |
| 62-26924 | 10/1988 | Japan . |

*Primary Examiner*—Mark D. Sweet
*Attorney, Agent, or Firm*—Timothy J. Troy

[57] ABSTRACT

The present invention relates to an organopolysiloxane emulsion composition comprising a hydroxy or alkoxy-endblocked diorganopolysiloxane, an alkoxy-group containing organosilicon compound, surfactant, and water. The compositions of this invention are characterized by a lack of offensive odor, high productivity and good storage stability. The organopolysiloxane emulsions of this invention are useful as fiber treatment agents. The fibers treated with the organopolysiloxane emulsion of this invention exhibit good feel.

19 Claims, No Drawings

ORGANOPOLYSILOXANE EMULSIONS AND FIBERS COATED THEREWITH

This is a divisional of application Ser. No. 08/362,626 filed on Dec. 22, 1994 now U.S. Pat. No. 5,521,238 of which the following is a specification.

BACKGROUND OF THE INVENTION

The present invention relates to an organopolysiloxane emulsion and fibers treated using the organopolysiloxane emulsion. More particularly, this invention relates to an organopolysiloxane emulsion useful as a fiber treatment agent, and fibers treated with the emulsion.

Organopolysiloxane emulsions wherein the viscosity of the emulsion is higher than that of the organopolysiloxane before emulsification can be produced using several methods. For example, Japanese Patent Application Publication No. 34-2041 (2,041/59) discloses organopolysiloxane emulsions which can be produced by the emulsion polymerization of an organopolysiloxane polymer by using an anionic emulsifier, cationic emulsifier, or nonionic emulsifier in the presence of a strong acid or a strong alkali catalyst. Japanese Patent Application Publication No. 41-13995 (13,995/66) discloses a method in which an anionic organopolysiloxane emulsion is formed by the emulsion polymerization of an organopolysiloxane by emulsifying the organopolysiloxane in water with benzenesulfonic acid or an alkyl benzenesulfonic acid with heating. However, during the preparation of this type of organopolysiloxane emulsion it is necessary to perform the emulsion polymerization at a prescribed temperature for 5–10 hours after the addition of a polymerization catalyst. Consequently, an extended period is required before packaging of the product and productivity is decreased.

Japanese Patent Application Laid Open Nos. 63-245466 (245,466/88) and 63-265924 (265,924/88) disclose an organopolysiloxane emulsion prepared by extending the chains of a diorganopolysiloxane having two terminals of the molecular chain blocked with hydroxyl groups by employing an aminoxy-group-containing organosilicon compound. However, when this organopolysiloxane emulsion is used as a fiber treatment agent, peculiar offensive odors associated with hydroxylamine derivatives which are formed as by-products in the chain extension reaction deteriorate the environment.

SUMMARY OF THE INVENTION

The present invention relates to an organopolysiloxane emulsion composition comprising a hydroxy or alkoxy-endblocked diorganopolysiloxane, an alkoxy-group containing organosilicon compound, surfactants, and water.

An object of the present invention is to provide an organopolysiloxane emulsion which has an excellent productivity, high storage stability, and is free of offensive odor.

Another object of the present invention is to provide fibers treated with the above organopolysiloxane emulsion.

A further object of the present invention is to provide an organopolysiloxane emulsion which can be used as a fiber treatment agent which provides various types of fibers with excellent feel.

These and other features, objects and advantages of the present invention will be apparent upon consideration of the following detailed description of the invention.

DETAILED DESCRIPTION OF THE INVENTION

The present invention relates to an organopolysiloxane emulsion composition comprising (A) 100 parts by weight of a diorganopolysiloxane having its general formula selected from the group consisting of:

(i) $R^2O(R_2SiO)_n(RR^1SiO)_mR^2$, (ii) $R^2O(R_2SiO)_nR^2$, and (iii) $R_2O(RR^1SiO)_mR^2$ wherein R is a monovalent hydrocarbon group having from 1 to 8 carbon atoms $R^1$ is a monovalent organic group, $R^2$ is selected from a hydrogen atom or an alkyl group, the value of n, m, or n+m is at least 10, and having a viscosity at 25° C. in the range of 30–100,000 mm²/s, (B) 0.1–20 parts by weight of an organosilicon compound having the general formula

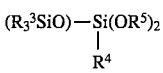

wherein $R^3$ is a monovalent hydrocarbon group having from 1 to 8 carbon atoms, $R^4$ is an monovalent hydrocarbon group having from 1 to 8 carbon atoms, and $R^5$ is an alkyl group, (C) 1–60 parts by weight of a surfactant, and (D) water.

Component (A) is a compound having its general formula selected from the group consisting of (i) $R^2O(R_2SiO)_n(RR^1SiO)_mR^2$, (ii) $R^2O(R_2SiO)_nR^2$, and (iii) $R^2O(RR^1SiO)_mR^2$. The group R is a monovalent hydrocarbon group having from 1 to 8 carbon atoms including alkyl groups exemplified by methyl, ethyl, propyl, and butyl; alkenyl groups exemplified by vinyl, allyl, propenyl; aryl groups including phenyl and tolyl; aralkyl groups including 2-phenylethyl and 2-phenylpropyl. The group R can be the same or different as desired. It is preferred that R is methyl. The group $R^1$ is a monovalent organic group including alkyl groups exemplified by methyl, ethyl, propyl, and butyl; alkenyl groups exemplified by vinyl, allyl, propenyl; aryl groups including phenyl and tolyl; aralkyl groups including 2-phenylethyl and 2-phenylpropyl; halogen-substituted alkyl groups including 3,3,3-trifluoropropyl; amino-group-substituted alkyl groups including 3-aminopropyl; alkylamino-group-substituted alkyl groups including 3-(N-ethylamino)propyl, 3-(N-butylamino)propyl, 4-(N-cyclohexylamino)butyl, 4-(N-phenylamino)butyl, N-aminoethylaminopropyl, 2-(N,N-dimethylamino)ethyl; acyl-group-substituted alkyl groups including 3-glycidoxypropyl; epoxy-group-containing alkyl groups including 3,4-epoxycyclohexylpropyl; mercapto-group-substituted alkyl groups including 3-mercaptopropyl; acyloxy-group-substituted alkyl groups including 3-methacryloxypropyl group. The group $R^1$ can be the same or different as desired. It is preferred that over 50% of the $R^1$ groups are methyl.

The group $R^2$ in (A) is a hydrogen atom or an alkyl group exemplified by methyl, ethyl, and propyl, and the value of n, m, or n+m is at least 10 so that the viscosity of component (A) at 25° C. is 30 to 100,000 mm²/s. The value of n+m is preferably above 50, and it is even more preferred that m+n ranges from 100 to 3,000. It is preferred that n have a value of 10 to 2000 and m have a value of from 10 to 100, and m+n has a value of 100 to 1000. If n, m, or m+n is less than 10, then the viscosity of (A) is such that an organopolysiloxane emulsion composition having a large dispersion is produced. Examples of (A) include dimethylpolysiloxanes having the two terminals of their molecular chain blocked with hydroxy groups, dimethylsiloxane-methyl(N-aminoethylaminopropyl)siloxane copolymers having the two terminals of their molecular chain blocked with hydroxy groups, dimethylsiloxane-methyl (3-aminopropyl) siloxane copolymers having the two terminals of their molecular chain blocked with hydroxy groups, dimethylpolysiloxanes having the two terminals of their molecular chain blocked with methoxy groups, dimethylsiloxane-methyl(N-aminoethylaminopropyl)siloxane copolymers having the two terminals of their molecular chain blocked with methoxy groups, and dimethylsiloxane-methyl (3-aminopropyl)siloxane copolymers having the two terminals of their molecular chain blocked with methoxy groups.

Organosilicon compound (B) is a chain extension agent. It undergoes a condensation reaction with the terminal groups of the molecular chain of the diorganopolysiloxane (A) and acts to increase the molecular weight of component (A). Organosilicon compound (B) is a compound having the general formula

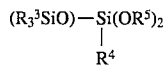

$$(R_3^3SiO)-\underset{R^4}{Si(OR^5)_2}$$

wherein $R^3$ is a monovalent hydrocarbon group having from 1 to 8 carbon atoms including alkyl groups exemplified by methyl, ethyl, propyl, and butyl; alkenyl groups exemplified by vinyl, allyl, propenyl; aryl groups including phenyl and tolyl; aralkyl groups including 2-phenylethyl and 2-phenylpropyl. The group $R^3$ can be the same or different as desired. Among the three $R^3$ groups, it is preferred that one be vinyl and that the other two be methyl or ethyl. The group $R^4$ is a monovalent hydrocarbon group having from 1 to 8 carbon atoms as defined hereinabove for $R^3$. It is preferred that $R^4$ is vinyl. When $R^4$ is vinyl, the condensing reactivity of the alkoxy group in (B) on the silanol group or alkoxy group in component (A) rises. In the above formula $R^5$ denotes an alkyl group. It is preferred that $R^5$ is methyl, ethyl, or propyl. Specific examples of compound (B) include $$(CH_3)_3SiO-\underset{CH=CH_2}{Si(OCH_3)_2},$$

$$(CH_3)_3SiO-\underset{CH=CH_2}{Si(OC_2H_5)_2},$$

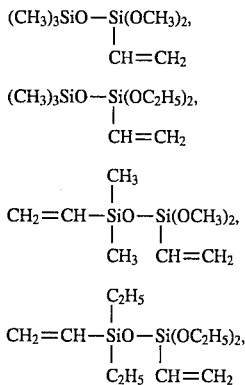

$$CH_2=CH-\underset{CH_3}{\overset{CH_3}{Si}}O-\underset{CH=CH_2}{Si(OCH_3)_2},$$

$$CH_2=CH-\underset{C_2H_5}{\overset{C_2H_5}{Si}}O-\underset{CH=CH_2}{Si(OC_2H_5)_2},$$

and

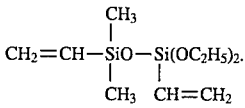

$$CH_2=CH-\underset{CH_3}{\overset{CH_3}{Si}}O-\underset{CH=CH_2}{Si(OC_2H_5)_2}.$$

The alkoxy-group-containing organosilicon compounds may be prepared, for example, by adding into a four-necked flask, vinyltriethoxysilane having the formula $CH_2=CHSi(OC_2H_5)_3$, syndivinyltetramethyldisiloxane having the formula:

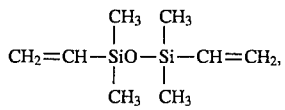

$$CH_2=CH-\underset{CH_3}{\overset{CH_3}{Si}}O-\underset{CH_3}{\overset{CH_3}{Si}}-CH=CH_2,$$

and a weakly acidic catalyst and reacting them at 80°–100° C. After the reaction, a high-precision rectifier is used to process the desired alkoxy-group-containing organosilicon compound which has the following formula:

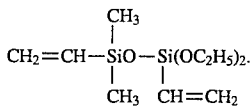

$$CH_2=CH-\underset{CH_3}{\overset{CH_3}{Si}}O-\underset{CH=CH_2}{Si(OC_2H_5)_2}.$$

This Compound (B) should be present in the organopolysiloxane emulsion compositions in an amount ranging from 0.1–20 parts by weight, and preferably 0.1–10 parts by weight, said weight parts being based on 100 parts by weight of (A).

The surfactant (C) is one needed for the emulsification of components (A) and (B). It may be a nonionic surfactant, anionic surfactant, cationic surfactant, or amphoteric surfactant.

Examples of suitable nonionic surfactants include polyoxyalkylene alkyl ether, polyoxyalkylene alkyl phenyl ether, polyoxyalkylene alkyl ester, polyoxyalkylene sorbitan alkyl ester, polyethylene glycol, polypropylene glycol, and diethylene glycol.

Examples of suitable anionic surfactants include hexylbenzenesulfonic acid, octylbenzenesulfonic acid, decylbenzenesulfonic acid, dodecylbenzenesulfonic acid, cetylbenzenesulfonic acid, myristylbenzenesulfonic acid, and other alkylbenzenesulfonic acids and their salts; sulfuric esters of polyoxyethylene alkyl ether including $CH_3(CH_2)_6CH_2O(C_2H_4O)_2SO_3H$, $CH_3(C_2)_7CH_2O(C_2H_4O)_{3.5}SO_3H$, $CH_3(CH_2)_8CH_2O(C_2H_4O)_8SO_3H$, $CH_3(CH_2)_{19}CH_2O)(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid.

Examples of suitable cationic surfactants include octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide, dioctadecyldimethylammonium hydroxide, tallow trimethylammonium hydroxide, coconut oil, trimethylammonium hydroxide, and other quaternary ammonium hydroxides and their salts.

Examples of the amphoteric surfactants that can be used include amine acid surfactants and betaine acid surfactants. Combinations of 2 or 3types of nonionic surfactants, combinations of nonionic surfactants and anionic surfactants, and combinations of nonionic surfactants and cationic surfactants are preferred. Surfactant (C) should be present in the organopolysiloxane emulsion compositions in an amount ranging from 1–60 parts by weight, and preferably 2–50 parts by weight, said weight parts being based on 100 parts by weight of (A).

The organopolysiloxane emulsion compositions can be prepared by the emulsion polymerization of said components (A) and (B) in water in the presence of component (C). The amount of water used should be appropriate to ensure that the total concentration of components (A) and (B) is 5–60 wt %, preferably 10–50 wt %. In the emulsion polymerization, components (A) and (B) are uniformly blended with each other. Component (C) and a small amount of water are then added for uniform blending. Emulsification is performed on a colloid mill, line mill, homomixer, or other emulsifier. If needed, more water is added for uniform emulsification and dispersion. It is also possible to further stabilize the emulsion after emulsification by means of a homegenizer or some other emulsifier. The obtained emulsion is left undisturbed or stirred an room temperature, so that component (A) is chain extended by component (B), forming an emulsion of an oil-like organopolysiloxane or gum-like organopolysiloxane with a viscosity higher than that of component (A). When the organopolysiloxane emulsion of this invention is produced, there is no need to heat it. However, heating can shorten the polymerization time. Usually, it is preferred the system be left undisturbed or stirred for 12 hours at a low temperature of about 5° C., or for longer than 30 minutes at a high temperature of about 70° C.

The organopolysiloxane emulsion compositions of this invention can further comprise any conventional fiber treatment additives. Examples of additives include organoalkoxysilanes, salts of iron, lead, antimony, cadmium, tin, titanium, calcium, bismuth, zirconium, and other metals with organic carboxylic acids, triethanolamine, triethylenediamine, dimethylphenylamine, and other organic amine compounds as condensing catalysts, preservatives, and coloring agents.

As explained above, after the various components and water are blended with each other, the mixture is simply left undisturbed at room temperature. Consequently, it is possible to package the organopolysiloxane emulsion composition immediately after emulsification. Also, since the emulsion composition of this invention is an emulsion of an organopolysiloxane with a very high viscosity, the composition can be effectively used as a fiber treatment agent, lubricant, mold releasing agent, glazing agent, and coating.

When the compositions of this invention is used for fiber treatment, the composition is applied (coated) onto the fibers by means of spraying, rolling, brushing, or dipping. The coated fibers are then left at room temperature, blown with hot air, or are heated. The amount of composition on the fiber is usually ranges from 0.01–10.0 wt % in organopolysiloxane equivalents with respect to the fibers.

Examples of fibers that can be treated with the compositions of this invention include glass fibers, carbon-fiber feed yarns, silicon carbide fibers, and other inorganic fibers, polyester, polyamide, polyacrylonitrile, vinylon, polyethylene, polyvinyl chloride, polypropylene, spandex, and other synthetic fibers, acetate fibers, semisynthetic fibers, wool, silk, hemp, cotton, angora rabbit hair, mohair, asbestos, and other natural fibers, rayon, bemberg, and other recycled fibers, as well as other organic fibers. The fibers may take various forms, including staple, filaments, tow, top, and yarns. The forms of the fabrics include knitwear, woven fabrics, and nonwoven fabrics.

In the examples, parts refers to parts by weight, and viscosity refers to the value at 25° C. In addition, the viscosity of the organopolysiloxane in the compositions of this invention was measured using the following method: 20 parts of isopropyl alcohol were added to 100 parts of the composition to break up the emulsion. The organopolysiloxane layer on the outer surface was removed and the volatile component was removed in an oven at 110° C. The viscosity of the organopolysiloxane emulsion extracted in this manner was measured using a rotating viscosimeter.

EXAMPLE I

About 39.0 parts of a diorganopolysiloxane having a viscosity of 1,180 mm$^2$/s and having the average formula:

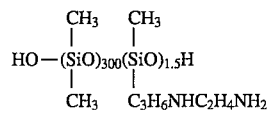

and 1.0 part of a methoxy-group-containing organosilicon compound having the formula:

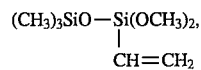

were uniformly blended. The obtained mixture was blended with 4.0 parts of polyoxyethylene (6-mol) lauryl ether and 54.9 parts of water, followed by emulsification in a colloid mill type of emulsifier to produce a uniform organopolysiloxane emulsion. About 0.1 part of acetic acid was added to the organopolysiloxane emulsion to adjust the pH to 7.

Efforts were made to measure the viscosity of the organopolysiloxane in the obtained organopolysiloxane emulsion. However, since the sample was in gum form, it was impossible to measure the viscosity. Thus the chain-extension effect was rather significant. No special odor was detected in the organopolysiloxane emulsion. After setting at 25° C. for 7 days, no change in the appearance of the organopolysiloxane emulsion was observed. Also, no water separation and floating of the oil was observed (i.e. the organopolysiloxane emulsion was found to be highly stable).

Comparison Example I

In this comparative example, an organopolysiloxane emulsion was prepared in the same way as in Example I, except that the methoxy-group-containing organosilicon compound of Example I was replaced by an aminoxy-group-containing dimethylpolysiloxane having the formula:

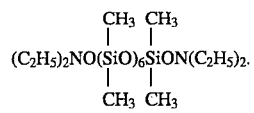

The obtained organopolysiloxane emulsion had a significant odor of N,N-diethylhydroxylamine.

Comparison Example II

In this comparison example, an organopolysiloxane emulsion was prepared according to Example I, except that the methoxy-group-containing organosilicon compound was not used. In the resulting composition, the organopolysiloxane had a viscosity of 1,170 mm$^2$/s. No chain-extension effect was observed.

Example II

About 39.2 parts of a dimethylpolysiloxane having its two terminals of its molecular chain blocked by hydroxy groups and having a viscosity of 2,500 mm$^2$/s and 0.8 parts of a methoxy-group-containing organosilicon compound having the formula:

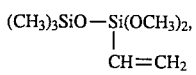

were uniformly blended. The obtained mixture was blended with 4.0 parts of polyoxyethylene (6-mol) lauryl ether, 0.4 parts of an anionic surfactant having the formula $C_9H_{19}O(C_2H_4O)_{3.5}SO_3Na$, and 55.6 parts of water, followed by emulsification in a colloid mill type of emulsifier to produce a uniform organopolysiloxane emulsion.

The viscosity of the organopolysiloxane in the obtained organopolysiloxane emulsion was 25,500 mm$^2$/s. Thus the chain-extension effect was rather significant. No odor was detected in the emulsion. After setting at 25° C. for 1 month, no change in the appearance of the organopolysiloxane emulsion was observed. Also, no water separation and floating of oil was observed (i.e. the organopolysiloxane emulsion was found to be highly stable).

Comparison Example III

In this comparison example, an organopolysiloxane emulsion was prepared according to Example II, except that the methoxy-group-containing organosilicon compound was not used. In the obtained organopolysiloxane emulsion, the organopolysiloxane had a viscosity of 2,500 mm$^2$/s indicating that no chain-extension effect was observed.

Example III

About 15.0 parts of a diorganopolysiloxane having a viscosity of 980 mm$^2$/s and having the following average formula:

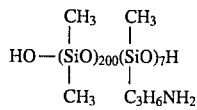

and 0.4 part of a methoxy-group-containing organosilicon compound represented by the following formula;

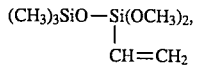

were uniformly blended. The obtained mixture was blended with 3.0 parts of polyoxyethylene (5-mol) lauryl ether and 2.0 parts of polyoxyethylene (10-mol) lauryl ether, followed by emulsification while being stirred with a propeller-type stirrer as 73.0 parts of water, 0.4 parts of a cationic surfactant having the formula $[C_{16}H_{33}N(CH_3)_2]^+Cl^-$, and 0.2 part of acetic acid were added slowly to form a transparent organopolysiloxane emulsion.

Efforts were made to measure the viscosity of the organopolysiloxane in the obtained organopolysiloxane emulsion. However, since the sample was in gum form, it was impossible to measure the viscosity. Thus the chain-extension effect was rather significant. No special odor was detected in the emulsion. After setting at 25° C. for 10 days, no change in the appearance of the emulsion was observed. Also, no water separation and floating of oil was observed (i.e. the organopolysiloxane emulsion was found to be highly stable).

Comparison Example IV

In this comparison example, an organopolysiloxane emulsion was prepared according to Example III, except that the methoxy-group-containing organosilicon compound used in Example III was not added here. In the resulting organopolysiloxane emulsion, the organopolysiloxane had a viscosity of 985 mm$^2$/s and no chain-extension effect was observed.

Example IV

About 50 parts of the organopolysiloxane emulsion prepared in Example I were diluted by 40 times using tap water. A piece of knit underwear (40 cm square) made of blend yarns containing 50% polyacrylonitrile staple fibers and 50% cotton was dipped in the dilute emulsion, and was pulled up after 10 sec. The knitwear was then squeezed by a mangle roll with a squeezing rate of 50 wt % (that is, the amount of organopolysiloxane attached was 0.5 wt %), followed by hanging at room temperature for drying. For the dried knitwear treatment using the organopolysiloxane emulsion of this invention, the residual odor level was measured, then the longitudinal-direction wrinkle prevention degree, stretching recovery rate, arid compressive modulus were evaluated according to JIS L-1018 "Knitwear feed material test method," with the results listed in Table I. When the feel of the treated knitwear was measured by touching with the finger, it was found to be very soft, and the fitting property and stretching recovery property were both good. The general effectiveness of the organopolysiloxane emulsion prepared according to Example I as a knitwear treatment agent was also evaluated, with the results listed in Table I.

Comparison Example V

A piece of knitwear was treated according to Example IV, except that the organopolysiloxane emulsion prepared in Example I was replaced by the organopolysiloxane emulsion prepared in comparison Example I. For the dried knitwear, the longitudinal-direction wrinkle prevention degree, stretching recovery rate, and compressive modulus were evaluated according to JIS L-1018 "Knitwear feed material test method," with results listed in Table I. Also, the residual odor level was measured, and it was found that there was a residual odor of N,N-diethylhydroxylamine. The general effectiveness of the organopolysiloxane emulsion prepared according to Comparison Example I as a knitwear treatment agent was also evaluated, with the results also listed in Table I.

Comparison Example VI

A piece of knitwear was treated according to Example IV, except that the organopolysiloxane emulsion prepared in Example I was replaced by the organopolysiloxane emulsion prepared in Comparative Example II. For the dried knitwear, the residual odor level was measured. Also, the longitudinal-direction wrinkle prevention degree, stretching recovery rate, and compressive modulus were evaluated according to JIS L-1018 "Knitwear feed material test method," with the results listed in Table I. Also, the feel of the processed knitwear was measured by touching with the finger. The feel was rough. The general effectiveness of the organopolysiloxane emulsion prepared according to Comparison Example II as a knitwear treatment agent was also evaluated with the results listed in Table I.

TABLE I

|  | Example IV | Comparison Example V | Comparison Example VI |
|---|---|---|---|
| Wrinkle prevention degree (%) | 84 | 83 | 76 |
| Stretching recovery degree (%) | 81 | 82 | 74 |
| Compressive modulus (%) | 83 | 83 | 73 |
| Residual odor | No | Yes | No |
| General evaluation | Effective | Ineffective | Ineffective |

That which is claimed is:

1. A treated substrate prepared by a method comprising the steps of:
   (I) mixing:
   (A) 100 parts by weight of a diorganopolysiloxane having the general formula $$R^2O(R_2SiO)_n(RR^1SiO)_mR^2$$

wherein R is a monovalent hydrocarbon group having from 1 to 8 carbon atoms, $R^1$ is a monovalent organic group, $R^2$ is selected from a hydrogen atom or an alkyl group, the value of m+n is at least 10, and has a viscosity at 25° C. in the range of 30–100,000 mm²/s;
   (B) 0.1–20 parts by weight of an organosilicon compound having the general formula $$(R_3{}^3SiO)-\underset{R^4}{Si(OR^5)_2}$$

wherein $R^3$ is a monovalent hydrocarbon group having from 1 to 8 carbon atoms, $R^4$ is an monovalent hydrocarbon group having from 1 to 8 carbon atoms, and $R^5$ is an alkyl group;
   (C) 1–60 parts by weight of a surfactant; and
   (D) water;
   (II) emulsifying the mixture of (I); and
   (III) applying the mixture from (II) to a substrate.

2. A substrate according to claim 1, wherein the method further comprises heating the mixture of (I) prior to step (II).

3. A substrate according to claim 1, wherein the method further comprises heating the substrate.

4. A substrate according to claim 1, wherein the substrate is selected from the group consisting of glass fibers, carbon-fiber feed yarns, silicon carbide fibers, polyester, polyamide, polyacrylonitrile, vinylon, polyethylene, polyvinyl chloride, polypropylene, spandex, acetate fibers, semisynthetic fibers, wool, silk, hemp, cotton, angora rabbit hair, mohair, asbestos, rayon and bemberg.

5. A substrate according to claim 1, wherein the substrate is a fiber selected from staple fibers, filament fibers, tow fibers, top fibers, or yarn fibers.

6. A substrate according to claim 1, wherein the substrate is a fabric selected from knitwear, woven fabrics, or nonwoven fabrics.

7. A substrate according to claim 1, wherein R is methyl.

8. A substrate according to claim 1, wherein $R^1$ is selected from the group consisting of alkyl groups, alkenyl groups, aryl groups, aralkyl groups, halogen-substituted alkyl groups, amino-group-substituted alkyl groups, alkylamino-group-substituted alkyl groups, acyl-group-substituted alkyl groups, epoxy-group-containing alkyl groups, mercapto-group-substituted alkyl groups, and acyloxy-group-substituted alkyl groups.

9. A substrate according to claim 1, wherein $R^1$ is selected from the group consisting of methyl, ethyl, propyl, butyl, vinyl, allyl, propenyl, phenyl, tolyl, 2-phenylethyl, 2-phenylpropyl, 3,3,3-trifluoropropyl, 3-aminopropyl, 3-(N-ethylamino)propyl, 3-(N-butylamino)propyl, 4-(N-cyclohexylamino)butyl, 4-(N-phenylamino)butyl, N-aminoethylaminopropyl, 2-(N,N-dimethylamino)ethyl, 3-glycidoxypropyl, 3,4-epoxycyclohexylpropyl, 3-mercaptopropyl, and 3-methacryloxypropyl.

10. A substrate according to claim 1, wherein R and $R^1$ are methyl, $R^2$ is selected from hydrogen or methyl, n has a value of zero, and m has a value of at least 10.

11. A substrate according to claim 1, wherein R is methyl, $R^1$ is N-aminoethylaminopropyl, $R^2$ is selected from hydrogen or methyl, n has a value of 10 to 2000, and m has a value of from 1 to 100.

12. A substrate according to claim 1, wherein R is methyl, $R^1$ is 3-aminopropyl, $R^2$ is selected from hydrogen or methyl, n has a value of 10 to 2000, and m has a value of from 1 to 100.

13. A substrate according to claim 1, wherein (B) is selected from the group consisting of:

$$(CH_3)_3SiO-\underset{CH=CH_2}{Si(OCH_3)_2},$$

$$(CH_3)_3SiO-\underset{CH=CH_2}{Si(OC_2H_5)_2},$$

$$CH_2=CH-\underset{CH_3}{\overset{CH_3}{Si}}O-\underset{CH=CH_2}{Si(OCH_3)_2},$$

$$CH_2=CH-\underset{C_2H_5}{\overset{C_2H_5}{Si}}O-\underset{CH=CH_2}{Si(OC_2H_5)_2},$$

and $$CH_2=CH-\underset{CH_3}{\overset{CH_3}{Si}}O-\underset{CH=CH_2}{Si(OC_2H_5)_2}.$$

14. A substrate according to claim 1, wherein (C) is selected from a nonionic surfactant, anionic surfactant, cationic surfactant, or amphoteric surfactant.

15. A substrate according to claim 14, wherein the nonionic surfactant is selected from the group consisting of polyoxyalkylene alkyl ether, polyoxyalkylene alkyl phenyl ether, polyoxyalkylene alkyl ester, polyoxyalkylene sorbitan alkyl ester, polyethylene glycol, polypropylene glycol, and diethylene glycol.

16. A substrate according to claim 14, wherein the anionic surfactant is selected from the group consisting of hexylbenzenesulfonic acid, octylbenzenesulfonic acid, decylbenzenesulfonic acid, dodecylbenzenesulfonic acid, cetylbenzenesulfonic acid, myristylbenzenesulfonic acid, $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4)_8SO_3H$, $CH_3(CH_2)_{19}CH_2O(C_2H_4O)_4SO_3H$, $CH_3(CH_2)_{10}CH_2O(C_2H_4O)_6SO_3H$, sodium salts, potassium salts, and amine salts of alkylnaphthylsulfonic acid.

17. A substrate according to claim 14, wherein the cationic surfactant is selected from the group consisting of octyltrimethylammonium hydroxide, dodecyltrimethylammonium hydroxide, hexadecyltrimethylammonium hydroxide, octyldimethylammonium hydroxide, decyldimethylammonium hydroxide, didodecyldimethylammonium hydroxide, dioctadecyldimethylammonium hydroxide, tallow trimethylammonium hydroxide, coconut oil, and trimethylammonium hydroxide.

18. A substrate according to claim 14, wherein the amphoteric surfactant is selected from amino acid surfactants or betaine acid surfactants.

19. A substrate according to claim 1, wherein the mixture of (I) further comprises an additive selected from the group consisting of organoalkoxysilanes, salts of metals selected from iron, lead, antimony, cadmium, tin, titanium, calcium, bismuth, or zirconium, triethanolamine, triethylenediamine, and dimethylphenylamine.

* * * * *